United States Patent [19]

Haines et al.

[11] 4,266,490
[45] May 12, 1981

[54] SUGAR CANE PLANTER

[75] Inventors: Rolf Haines, Bundaberg; Robert M. Reid, North Bundaberg, both of Australia

[73] Assignee: Massey-Ferguson Services N.V., Curacao, Netherlands Antilles

[21] Appl. No.: 691,653

[22] Filed: Jun. 1, 1976

[30] Foreign Application Priority Data

Jun. 12, 1975 [GB] United Kingdom ............... 25290/75

[51] Int. Cl.³ ............................................. A01C 7/20
[52] U.S. Cl. ......................................... 111/3; 111/34; 111/77; 221/174; 221/254; 221/263
[58] Field of Search ................ 239/121; 221/174, 185, 221/254, 263, 277, 160–162, 167–169, 237; 111/2, 3, 34, 77

[56] References Cited

U.S. PATENT DOCUMENTS

| 800,288 | 9/1905 | Fulenwider | 221/169 |
|---|---|---|---|
| 1,401,885 | 12/1921 | Grump | 221/237 X |
| 1,912,248 | 5/1933 | Bateman et al. | 221/237 X |
| 2,625,122 | 1/1953 | Carelock | 111/3 |
| 2,638,246 | 5/1953 | Faust | 221/174 |
| 3,465,902 | 9/1969 | Colletti | 111/3 X |
| 3,584,787 | 6/1971 | Thomason | 239/121 |
| 3,702,664 | 11/1972 | Clement | 111/2 X |
| 3,841,529 | 10/1974 | Hatcher | 221/167 X |
| 3,907,135 | 9/1975 | Populin et al. | 111/3 X |
| 3,943,862 | 3/1976 | Populin et al. | 111/3 |
| 3,963,138 | 6/1976 | Fowler | 111/2 X |

FOREIGN PATENT DOCUMENTS

| 214115 | 4/1958 | Australia | 111/3 |
|---|---|---|---|
| 422252 | 11/1925 | Fed. Rep. of Germany | 111/3 |
| 126313 | 2/1958 | U.S.S.R. | 111/3 |

Primary Examiner—Steven A. Bratlie
Attorney, Agent, or Firm—Robert L. Farris

[57] ABSTRACT

A sugar cane planter has a series of cane carrier elements which are moved through a supply of randomly oriented cane billets to select billets and deliver them to a soil furrow. The cane carrier elements move in a circular path and are maintained horizontal throughout said movement by attitude control means thereby providing sufficient time for reliable pick-up, doffing of excess billets, and billet alignment. A supply of billets to the selection mechanism is maintained from a trailed cane bin having a cane elevator. Fungicide is sprayed on the billets carried by the elevator.

4 Claims, 12 Drawing Figures

SUGAR CANE PLANTER

This invention relates to planters for sugar cane or similar rod-like articles such as cassava.

Planters for sugar cane proposed previously have usually required the services of at least one operator to assist in feeding or aligning the cane to be planted during planting, in addition to a driver for the tractor hauling the planter. Such planters have usually been designed either to be supplied with whole cane sticks (which are cut by the planter into shorter lengths) or with cane pieces or billets which are all aligned in a particular direction before they are acted upon by the planter's mechanism.

Now that a large amount of sugar cane is harvested by machines which themselves cut the cane sticks into relatively short pieces or billets and deposit these pieces in random orientations in a container, there is a need for a planter capable of planting such cane pieces straight from the harvester without the need for any preliminary operations to be performed on the cane. That is to say, there is a need for a planter which can select and plant cane pieces from a mass of cane pieces lying in random orientations.

Attempts have been made to provide planters to meet this need, but these planters have for one reason or another not been satisfactory. An object of the invention is to provide improvements in this respect.

The sugar cane planter of this invention includes a movable support forming a portion of the pick-up hopper. A series of cane carrier elements are pivotally mounted on the support. An attitude control means is pivotally connected to the cane carrier elements. Drive means are provided to move the movable support relative to the remainder of the pick-up hopper and thereby move the cane carrier elements through the hopper where they pick up cane and to carry the cane to an unloading station outside the pick-up hopper. An unloading assembly is provided at the unloading station to remove cane from the cane carriers.

Embodiments of the invention will now be described by way of example, with reference to the accompanying drawings in which.

Figure 1:
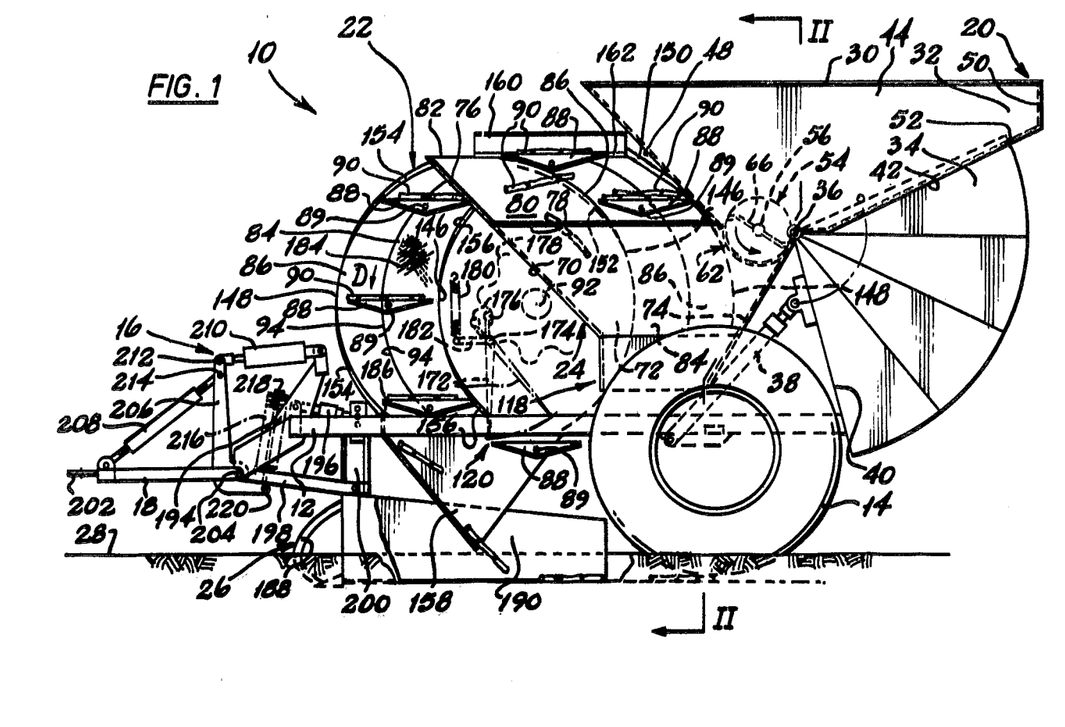
FIG. 1 shows in side elevation a planter for sugar cane.

As shown in the drawings, a planter 10 for sugar cane or similar rod-like articles comprises a frame 12 carried on ground wheels 14. At the forward end of frame 12 a height adjustment linkage 16 including a drawbar 18 is provided. The drawbar connects the planter in fully trailed fashion to a drawhook (not shown) of a tractor (not shown) and the linkage 16 allows the height of the forward end of frame 12 to be adjusted relative to drawbar 18.

Mounted on frame 12 are a main hopper 20 to contain pieces of sugar cane stick or billets, a mechanism 22 for dispensing the cane billets, the mechanism including a pick-up hopper 24, and a furrow-opening and cane-dropping assembly 26 to open a furrow in the soil 28 and guide the billets into the furrow.

Main hopper 20 is open at its upper edge 30 to receive billets in random alignments direct from a chopper type sugar cane harvester cutting green cane, or from elsewhere. The hopper comprises a fixed portion 32 and a movable portion 34. The movable portion constitutes an extension of the fixed portion to increase the billet carrying capacity thereof. The movable portion is mounted on the fixed portion by a transverse pivot 36 and is movable by means of a hydraulic ram 38 acting against frame 12, between the lowered position shown in FIG. 1 and a raised position in which rear wall 40 of the movable portion lies approximately parallel with rear edges 42 of the side walls of fixed hopper portion 32. Wall 40 constitutes movable cane support means.

Fixed hopper portion 32 has side walls 44, 46, a sloping front wall 48, and a short rear wall 50 which has a lower edge 52. A large opening between edge 52 and the pivot 36 of movable hopper portion 34 provides access for cane billets to the movable hopper portion.

Conveyor means comprising an auger 54 is mounted within fixed hopper portion 32 on a transverse shaft to convey cane billets from main hopper 20 to pick-up hopper 24. The auger comprises a cylindrical drum 58 and a shallow helical auger flight 60. The auger extends across slightly less than half the width of the hopper and feeds billets towards an opening 62 formed at the left hand side of front wall 48 of hopper portion 32 and adjacent to the lower edge 64 of said wall.

A series of radial feed fingers 66 are mounted on shaft 56 adjacent opening 62 so as to rotate with auger 54 and feed billets through the opening. Four downwardly-projecting feed control fingers 68 are pivotally mounted on wall 48 and spring-biased towards the position shown in FIG. 2 in which they extend across opening 62 so as to restrict the rate of feed of billets through the opening.

Pick-up hopper 24 is positioned in front of and somewhat lower than main hopper 20. It comprises a front wall 70 lying in a plane approximately parallel to that of front wall 48 of hopper 20, sloping left and right hand side walls 72, 73 respectively and a sloping rear wall 74 extending up to a position adjacent auger 54. Thus the opening 62 in front wall 48 of hopper 20 opens directly into hopper 24, and auger 54 and feed fingers 66 constitute conveyor means to convey cane billets from main hopper 20 to pick-up hopper 24.

The upper edge 76 of front wall 70 of pick up hopper 24 slopes upwards and away from the upper edge 78 of left hand side wall 72 for a purpose to be described.

Figure 2:
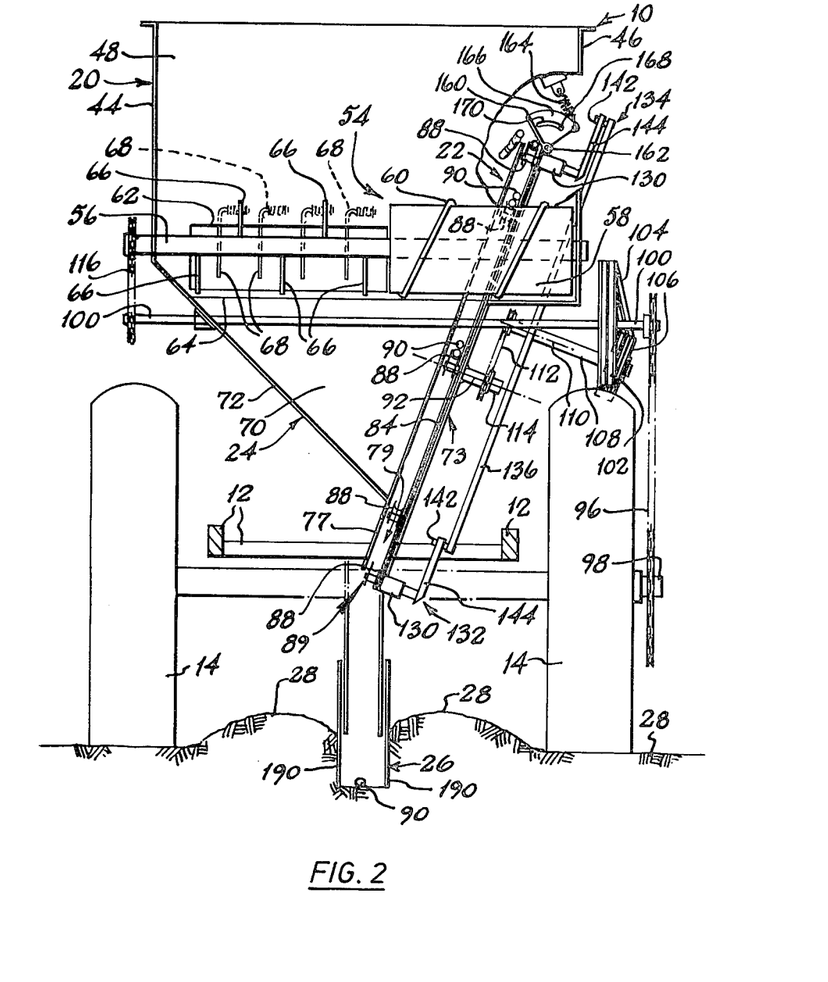
FIG. 2 shows a sectional view of the planter of FIG. 1 as indicated by the arrows II—II in FIG. 1.

The left and right hand side walls 72 and 73 of pick up hopper 24 converge downwardly so as to tend to align cane pieces therein parallel to the direction of forward movement of the planter, as shown in FIG. 2. Left hand side wall 72 terminates in a flange 77 parallel to and spaced from wall 73 to define an opening 79 for a purpose to be described.

The walls of pick-up hopper 24 are formed of sheet metal suitably fastened together by welding. The right hand side wall 73 includes a portion 80 complementing front wall 70 and fastened thereto. Wall portion 80 has a horizontal upper edge 82.

An approximately arcuate gap is formed in the sheet metal of right hand side wall 73 to expose cane billets in the hopper to the action of a rotatable support plate 84 and an associated non-rotatable backing plate 86. Support plate 84 and backing plate 86 extend behind (as seen in FIG. 1) wall portion 80 for a purpose to be described.

A series of eight cane carrier elements 88 are mounted on support plate 84 at spaced positions thereon for pivotal movement with respect thereto about respective pivots 89. The cane carrier elements 88 together with pick up hopper 24 and support plate 84 and backing plate 86 constitute important parts of the billet dispensing mechanism 22.

As shown in FIG. 2, support plate 84 lies in a plane inclined with respect to the vertical in a direction such that cane pieces 90 lying on the cane carrier elements 88 (as will be described) tend to roll towards the support plate (see FIG. 2). The support plate is mounted so as to be rotatable about a transverse axis 92 at right angles to the plate. The support plate upwardly from left to right of the planter as seen in FIG. 2.

Support plate 84 has a circular outer periphery 94 adjacent which the cane carrier elements 88 are pivotally mounted at equally circumferentially spaced positions. Backing plate 86 has a circular internal periphery complementary to the external periphery of the support plate which fits closely therein.

A drive for rotating support plate 84 about axis 92 comprises a chain drive 96 from the axle 98 on which ground wheels 14 are mounted, to a transverse countershaft 100. A vee belt pulley 102 on the countershaft transmits drive via a twin vee belt 104 to a corresponding pulley 106 fastened to a shaft 108 rotatable about an axis 110 parallel to axis 92 of support plate 84. A chain drive 112 connects shaft 108 and a stub shaft 114 fastened to the support plate. A chain drive 116 from the left hand end of countershaft 100 transmits drive to shaft 56 and hence to billet feeding auger 54.

As the cane carrier elements 88 rotate with support plate 84 they are carried in an endless circuit successively through a cane loading station 118 and then, after having travelled through about 90 percent of a complete circuit or revolution, through a cane unloading station 120. At the cane loading station, each cane carrier element picks up one or more cane pieces. At the cane unloading station the cane pieces are unloaded one by one into one dropping assembly 26.

Figure 4:
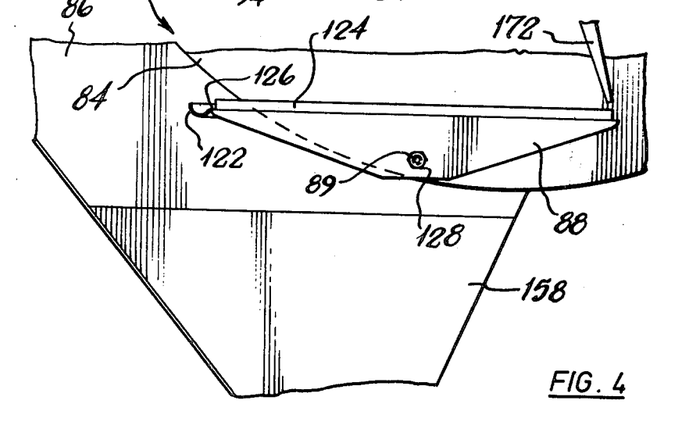
FIG. 4 is a perspective view on a larger scale of a cane carrier element also seen in FIG. 1, the element being shown at a cane unloading station.
Figure 5:
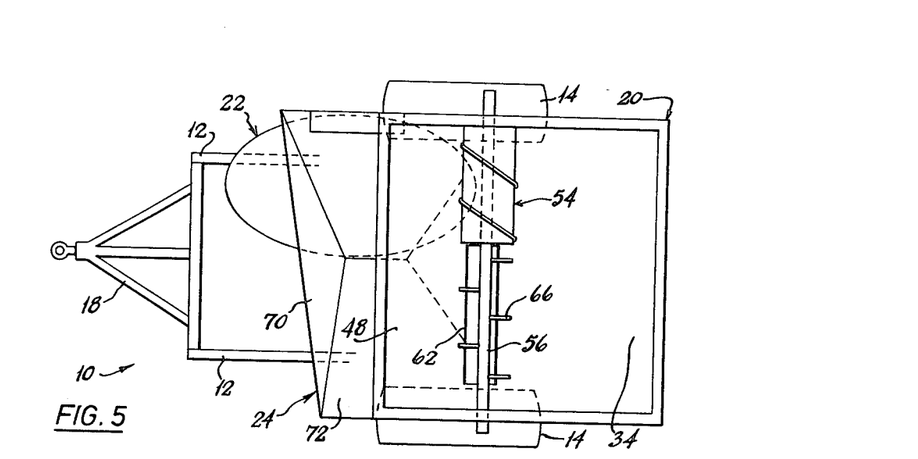
FIG. 5 is a diagrammatic plan view of the planter of FIGS. 1 to 4 showing only the general arrangement thereof.

As shown in FIG. 4, each cane carrying element 88 is in the form of a generally V-shaped sheet metal pressing having a flange 122 formed at its upper edge. The upper surface of the flange constitutes a cane support surface and the flange is formed with a longitudinally-extending shallow curved channel-section or groove shape so as to tend to retain a cane piece therein. The cane retaining capacity of the cane carrying element is further enhanced by the provision of an upright flange 124 welded to the element along the edge 126 at which flange 122 is joined to the remainder of the element.

Each cane carrying element is rigidly secured to a bolt 128, the longitudinal axis of which constitutes the pivot axis 89, of the element. Each bolt 128 is journalled in a bearing 130 (see FIG. 2) secured to the back of support plate 84 and connected to attitude control means 132 which maintains the cane carrier elements in a constant attitude with respect to a horizontal plane, as the elements are carried round by support plate 84. The cane carrying elements are set so that their cane support flanges 122 are kept horizontal, as can be seen from FIG 1.

Figure 3:
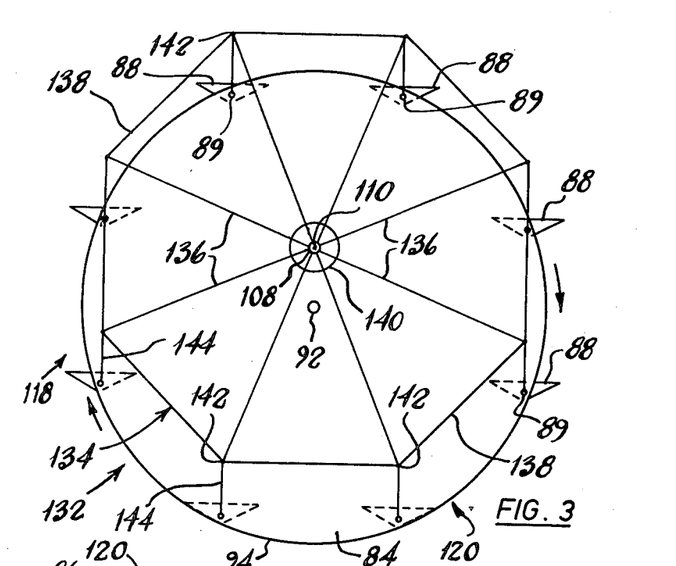
FIG. 3 illustrates, diagrammatically, an attitude control mechanism for cane carrier elements forming part of the planter of FIGS. 1 and 2.

The attitude control means 132 is shown in FIGS. 2 and 3 and comprises a control member 134 in the form of a rigid octagonal frame mounted for rotation in a plane parallel to that of support plate 84 about axis 110 which is offset upwards from the axis 92 of rotation of support plate 84. Frame 134 has eight radial arms 136 and eight stays 138 interconnecting the ends of the arms 136. The radially inner ends of arms 136 are secured to a hub 140 fastened to shaft 108.

A pivot pin 142 is welded to frame 134 at each angle of the periphery thereof and the pins project towards support plate 84. L-shaped control links 144 are provided, one for each pivot pin 142, and are each pivotally mounted at one end on said pin and at the other end are rigidly fastened, one to each bolt 128 of the cane carrying elements 88.

As can be seen from FIG. 1, support plate 84 and backing plate 86 are shaped and proportioned so that their combined width, measured in the horizontal direction at any point on the endless circuit of the cane carrier elements 88, is equal to the length of the cane carrier elements themselves, measured in the same direction. Accordingly, the ends of the flange 122 of each cane carrier element are at all times (except in the region of the top and bottom dead center positions) located close either to the inner periphery 146 of support plate 84, or to the outer periphery 148 of backing plate 86.

Alignment members 150, 152, 154 and 156 are provided at the said peripheries 146, 148 so as to engage cane pieces carried by the cane carrier elements 88 which overlap the edges of said elements or are otherwise improperly positioned thereon, and to centralize and push down to a horizontal position these cane pieces.

The alignment members 150, 152, 154 and 156 are in the form of steel flanges curved to the profiles 146, 148 of the peripheries of the support plate 84 and backing plate 86 and defining with plates 84 and 86 a shallow channel through which pass the cane carrier elements 88 and the pieces of cane 90 carried thereby.

Alignment members 150 and 152 extend upwards from positions inside pick-up hopper 24 and terminate at positions close to the top dead centre position of the cane carrier elements. The position of alignment member 152 is indicated in FIG. 1 but the member itself is hidden by wall 80 of hopper 24 because the plates 84 and 86 begin to pass behind wall 80 in this region.

Alignment member 156 extends adjacent the inner periphery of support plate 84 downwards between positions close to the top and bottom dead centre positions of the cane carrier elements 88. Alignment member 154 extends donwards from a position close to the top dead centre position of the cane carrier elements, to a location close to a chute 158 forming part of cane unloading station 120 and leading to cane dropping assembly 26.

Doffing means in the form of a doffing member 160 is provided at the top of the path of the cane carrier elements to remove excess cane pieces from the elements. The doffing member 160 is in the form of a flat plate pivotally mounted at its lower edge 162 and urged by a tension spring 164 acting on a bracket 166 secured to one end of the plate towards a position in which the plate slopes downwards, across the path of travel of the cane carrier elements 88 and towards said elements. The said position is defined by a stop in the form of a spigot 168 sliding in an arcuate slot 170 in bracket 166.

At the cane unloading station, a cane pusher member 172 mounted on a pivot 174 and having a follower 176 for engagement with an eight-lobe cam, is provided to unload the cane pieces one by one from the cane carrier elements 88. Follower 176 of cane pusher member 172 is urged into engagement with cam 178 by a tension spring 180 acting on an arm 182 fastened to the pusher member.

An arcuate-shaped strip or grill 184 of coarse mesh expanded metal is mounted over support plate 84 and backing plate 86 in the portion thereof between doffing member 160 and the lower end 186 of alignment member 154. Only a small area of strip 184 is shown in FIG. 1, but it is to be understood that it extends between the alignment members 154 and 156 so as to form, with the backing plate 186 and support plate 84, a shallow box-shaped tunnel through which the cane carrier elements 88 move. Strip 184 prevents dislodging of cane billets 90 from the carrier elements when the planter traverses uneven ground. It also allows visual inspection of cane carrier elements 88 and their billets as they pass through the tunnel.

Cane dropping assembly 26 comprises an approximately half-annular coulter 188 to cut the soil, and a pair of furrow-widening boards 190 to form a channel in the soil and into which the cane pieces are dropped one by one from chute 158.

Height adjustment linkage 16 comprises a mast 194 rigidly secured to the forward end of frame 12. Upper and lower parallel links 196 and 198 are pivotally connected at one end to mast 194 and at the other end are each pivotally connected to a frame 200 rigid with cane dropping assembly 26. Thus assembly 26 can rise and fall relative to mast 194 by pivotal movement of links 196 and 198.

Mast 194 is itself supported by a tractor through drawbar 18 and its tongue 202. The drawbar is connected to the mast by a pivot joint 204 which also connects link 198 to the mast.

The attitude of drawbar 18 relative to mast 194 and therefore the height from the ground of the front end of the planter is controlled by a linkage consisting of a bell crank 206, a turnbuckle link 208 and a hydraulic ram 210. Ram 210 and turnbuckle 208 are connected to the bell crank by pivot joints 212, 214. The other end of the ram is pivotally connected to mast 194. The other end of the turnbuckle is pivotally connected to drawbar 18. Thus, extension of ram 210 will tend to raise the mast 194 relative to the tongue 202 and a tractor drawbar.

The attitude of parallel links 196, 198 relative to mast 194, and therefore the height of cane dropping assembly 26 is influenced by a compression spring 216 acting between lower parallel link 198 and the lower end of bell crank 206. The spring is mounted on a rod 218 connected by a pivot 220 to the bell crank. The upper end of the spring transmits upward thrust to rod 218 through a plate (not shown) and the lower end of the spring acts against link 198. Thus upward movement of the cane dropping assembly 26 relative to mast 194 causes compression of spring 216, and vice versa.

Use of the planter 10 will now be described.

Tongue 202 is connected to the drawhook of a tractor and rams 38 and 210 are connected to the hydraulic control system of the tractor. Ram 38 is retracted to lower movable hopper portion 34, and the main hopper 20 is filled with billets of green cane in random orientations.

When it is desired to commence planting, ram 210 is retracted to lower the front end of the planter, including cane dropping assembly 26, which latter penetrates the soil. Auger 54 in hopper 20 feeds billets towards the left hand side (as seen in FIG. 2) of the hopper, and fingers 66 feed the billet through opening 62 into pick-up hopper 24. Feed control fingers 68 regulate this flow of billets.

The billets fall to the bottom of hopper 24 with some tendency to become aligned in the fore/aft direction by virtue of the downwardly converging side walls 72 and 73 of the hopper.

The mass of billets in hopper 24 is constantly stirred or agitated by the entry of cane carrier elements 88 to the hopper through opening 79 and their passage through the mass of billets.

Each cane carrier element 88 picks up at least one billet, and often as many as three billets, on its cane-supporting flange 122. These billets are carried upwards by the carrier element, out of pick-up hopper 24. The billets are retained on the carrier elements both by the inclination of the axis 92 of rotation of support plate 84 (whereby the billets tend to roll towards and lean against plate 84), and by the flange 124 at the front edge of each carrier element.

As the carrier elements travel upwards, any billets not lying horizonally and not positioned centrally thereon engage the curved alignment members 150 and 152 and are thereby pushed to approximately central horizontal positions.

When each carrier element reaches doffing member 160 all the cane billets thereon except the lower one are pushed off by the doffing member, as indicated in FIG. 2, and fall back to the mass of billets in the hopper. The resilient mounting of the doffing member allows it to accommodate varying cane thicknesses.

As the cane carrier elements 88 travel onwards, each carrying a single horizontal cane billet, the expanded metal grill 184 prevents the billet being dislodged even if the planter traverses very uneven ground. When elements 88 reach cane unloading station 120 pusher member 172, which reciprocates under the action of rotating cam 178, successively pushes the cane billets in the forward direction off one end of flange 122 and on to chute 158. The chute guides the billets one by one into cane dropping assembly 26 which forms a furrow in the soil and guides the cane pieces into the furrow. The furrow may be closed by an attachment (not shown) mounted on the planter, or by another implement travelling behind the planter.

Attachments (not shown) may also be provided for supplying fertilizer to the soil close to the planted cane and for spraying the cane pieces with fungicide.

Figure 6:
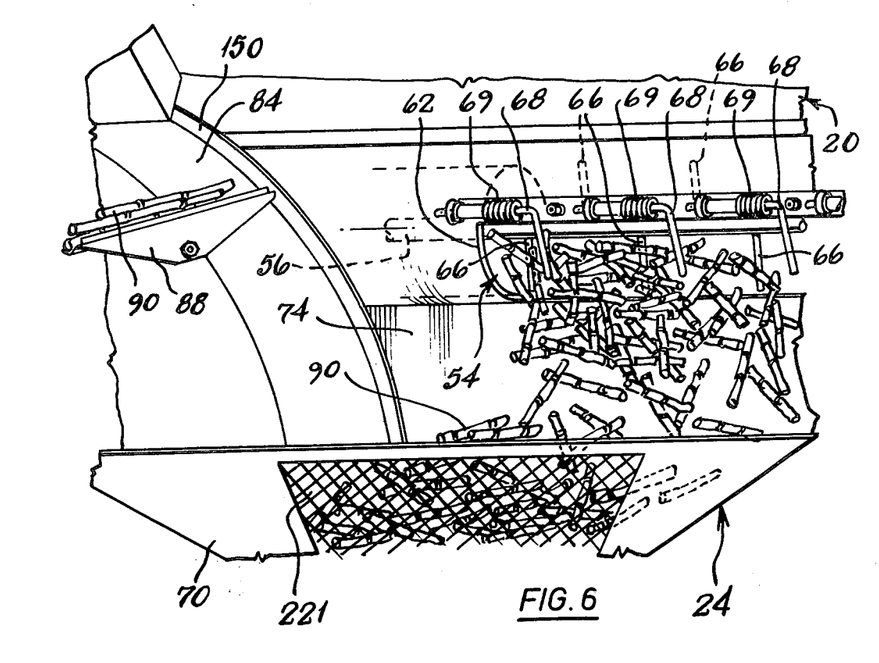
FIG. 6 is a perspective view into a pick-up hooper of the planter of FIGS. 1 to 5 showing a cane carrier element picking up cane pieces from a supply, and also showing the cane pieces being aligned and centralized on the cane carrier element by an alignment member.

During planting, the operator can check the feed of billets to the soil by viewing the cane carrier elements through screen 184. The operator can also actuate a first clutch (not shown) to interrupt drive to the cane carrier elements 88 when necessary (e.g. at headlands) and a second clutch to interrupt drive to auger 54 and feed fingers 66 (when pick-up hopper 24 contains sufficient cane). A window 221 of expanded metal (see FIG. 6) may be provided in the front wall 70 of hopper 24 to enable the operator to ascertain the level of cane billets therein.

The operator also periodically extends ram 38 a little to feed more cane billets to auger 54.

Parallel links 196, 198 and spring 216 allow the cane dropping and furrow opening assembly 26 to follow ground contours and to move upwards over rocks and tree roots. The half-annular shape of coulter 188 causes it to ride up and over all obstructions which it encounters thereby avoiding the problem hitherto encountered with coulters used for this purpose that they become hooked or jammed under rocks buried in the soil.

At the end of each row to be planted the cane dropping assembly 26 is raised by extending ram 210. Extension of the ram causes anticlockwise angular movement (as seen in FIG. 1) of links 196, 198 about the pivots at their forward ends, thereby raising assembly 26 relative to frame 12. Extension of the ram also swings the forward end of drawbar 18 downwards, thereby raising the rear end of the drawbar and with it the front end of frame 12 relative to the ground. At the same time, the operator actuates the first clutch to interrupt the drive to the cane dispensing mechanism.

Figure 7:
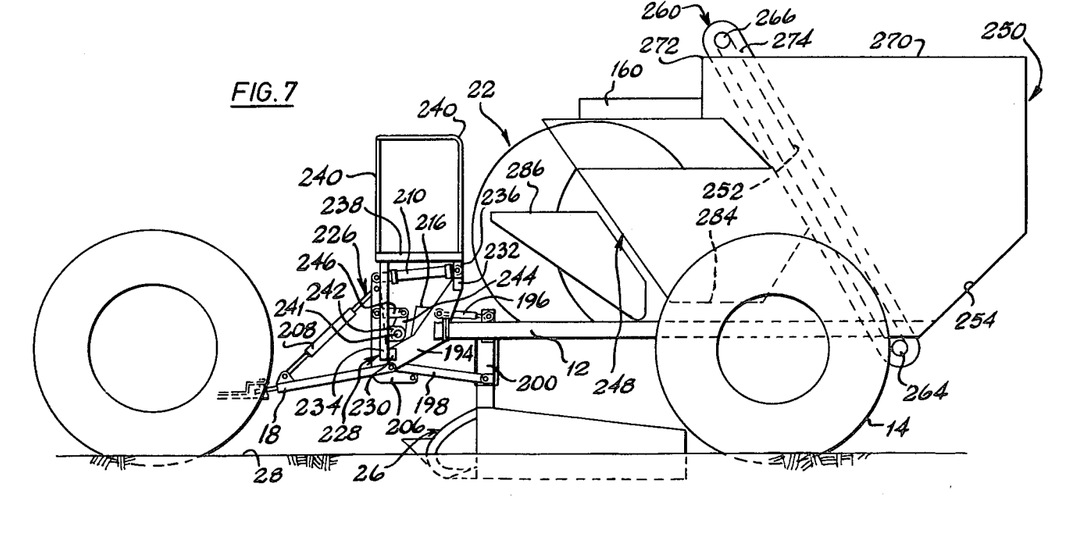
FIG. 7 shows, in a view similar to that of FIG. 1, a second embodiment of the invention for simultaneous planting of two rows of cane.
Figure 8:
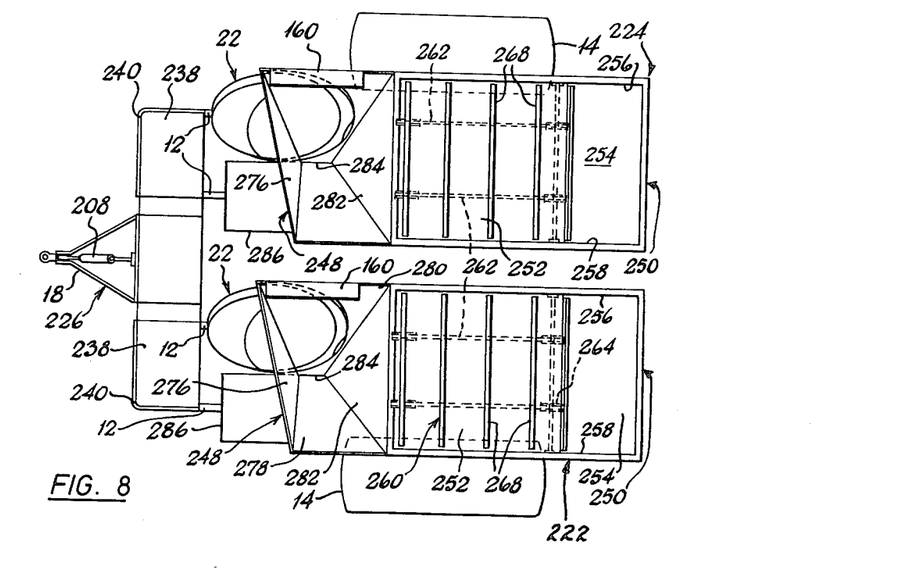
FIG. 8 shows a plan view of the planter of FIG. 7.

FIGS. 7 and 8 shows a further embodiment of the invention having the following main differences from the embodiment described above. Firstly, provision is made for simultaneous planting of two rows of cane; and secondly, a modified conveyor is provided to carry cane billets from the main hopper to the pick-up hopper.

In FIGS. 7 and 8, items which are substantially identical to the corresponding items in the embodiment of FIGS. 1 to 6 are given the same reference numerals as in the previous embodiment.

Two row planting is achieved by mounting two planter units 222, 224 side by side. The planter units are connected to a common height adjustment linkage 16 shown in FIG. 1.

Each planter unit has its own mast 194, parallel links 196, 198, frame 200, bell crank 206, hydraulic ram 210 and compression spring 216 constructed and arranged as in the previous embodiment.

The planter units are interconnected by a framework 228 comprising transverse beams 230, 232 secured to masts 194, and uprights 234, 236 supporting a platform 238 for an operator to stand on. The platform has safety rails 240 and provides a position from which an operator can supervize operation of the planter units.

Pivotally mounted centrally on framework 228 is the drawbar 18, its turnbuckle link 208 and the third bell carnk 206 to which the turnbuckle link and drawbar are pivotally connected. This third bell crank is not provided with its own compression spring 216 but is connected to the two springs of the individual planter units 222 and 224 through a transverse shaft 241. Shaft 241 is journalled in bearings 242 mounted on framework 228. Three crank links 244 are fastened to shaft 241 and pivotally connected, one to each bell crank 206, by respective adjustable connecting links 246.

The two hydraulic rams 210 are connected to the tractor's hydraulic system (or to a hydraulic pump mounted on the planter and driven by the tractor's power take-off shaft) in parallel, so as to be operated simultaneously.

The height adjustment linkage 226 operates in an exactly analogous manner to the linkage 16 of the previous embodiment.

The cane dispensing mechanism 22 of each planter unit, including the cane carrier elements, is substantially similar to that of the previous embodiment, but the manner of feeding cane pieces to the pick-up hopper 248 from the main hopper 250 and the shapes of the hoppers themselves are modified.

Main hopper 250 of each planter unit has no moving portion corresponding to the movable hopper portion 34 in the previous embodiment, but has downwardly-converging front and rear walls 252, 254 and vertical side walls 256, 258.

A chain and slat or scraper-type conveyor 260 is provided to convey cane pieces from each main hopper 250 to its pick-up hopper 248. The conveyor comprises transversely-spaced roller chains 262 trained round lower driven sprockets 264 (connected by a drive not shown, to ground wheels 14) and upper idler sprockets 266. Transverse scraper bars or slats 268 are mounted on the chains 262 to carry cane pieces over a support surface constituted by front wall 252 of the main hopper.

Each conveyor 260 extends from the bottom of its main hopper 250 to a position slightly above the level of the upper edges 270 of the side walls 256 and 258 so as to deliver cane pieces over the front upper edge 272 of the main hopper into the pick-up hopper 248. For this purpose a short extension portion 274 of the front hopper wall 252 is provided.

As shown in FIG. 8, the width of each conveyor 260 (i.e. the length of slats 268) is equal to the full width of its respective hopper 250.

Each pick-up hopper 248 is of course open at the top to receive billets from its conveyor 260. Hopper 248 comprises a front wall 276, left and right hand side walls 278 and 280 respectively, and a rear wall 282. The walls converge downwardly towards the base 284 of the hopper where the cane carrier elements (not shown) enter the hopper, as in the previous embodiment.

A fertilizer hopper 286 is mounted just in front of pick-up hopper 248 and a mechanism (not shown) is provided for dispensing fertilizer from it and for delivering the fertilizer to the soil.

In use, conveyors 260 deliver cane billets to their respective pick-up hoppers, and the selection and dispensing of the billets proceeds in the same manner as in the previous emboidment.

Figure 9:
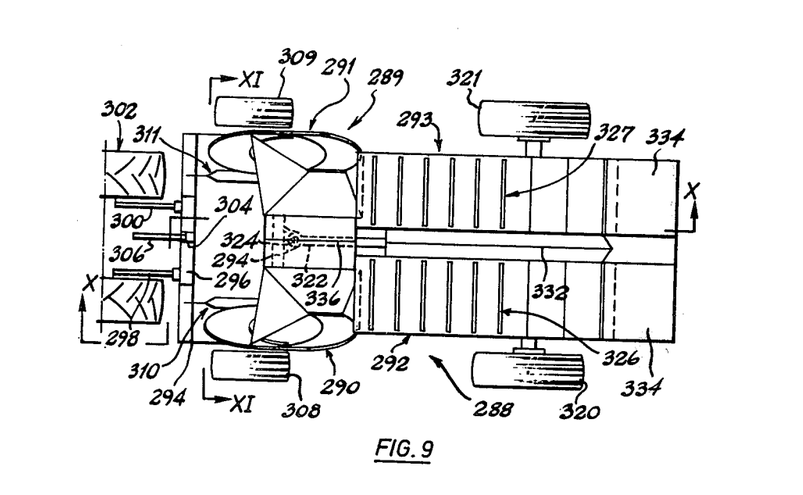
FIG. 9 shows a plan view of a third embodiment of the invention.
Figure 10:
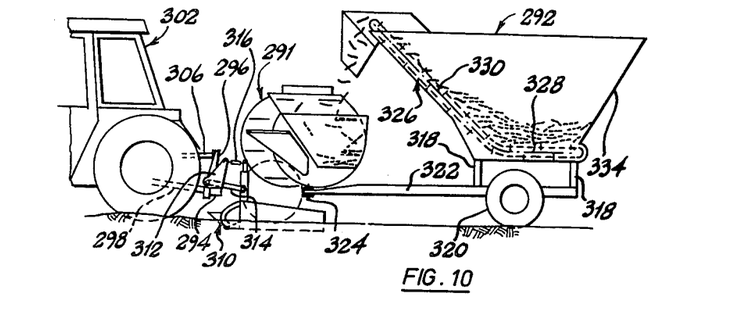
FIG. 10 shows a partly sectional side elevation view of the planter of FIG. 9, as indicated by arrows X—X therein.
Figure 11:
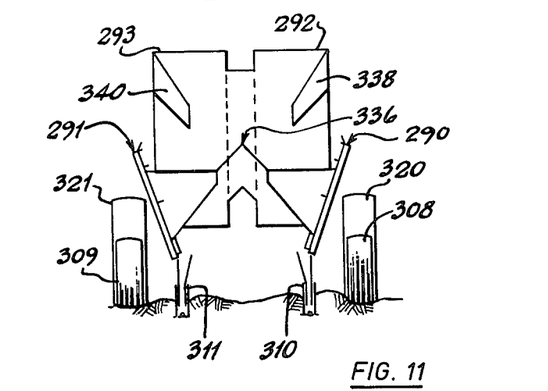
FIG. 11 shows a partly sectional front elevation view of the planter of FIG. 9, as indicated by arrows XI—XI therein.

The cane planter of FIGS. 9, 10 and 11 comprises two planter units 288, 289 arranged side-by-side for simultaneous planting of two rows of cane. The planter units comprise respective billet dispensing mechanisms 290, 291 which are substantially similar to the mechanisms 22 of the previous embodiments and which will therefore not be described in detail, and respective main hoppers 292, 293 each to contain a relatively large quantity of cane billets.

The two billet dispensing mechanisms 290, 291 of the planter units 288, 289 are mounted on a common rectangular frame 294. Frame 294 has at its forward end, attachment means in the form of a conventional A-frame 296 whereby it is adapted to be connected to the draught links 298, 300 of the 3 point hitch of an agricultural tractor 302. The A-frame also provides an upper connector 304 which receives the top link 306 of the tractor's hitch. Two depth wheels 308, 309 are mounted on frame 294 at opposite sides thereof so as to be height adjustable. These wheels limit the depth at which cane billets are planted by the planter. The billet dispensing mechanisms may be driven from depth wheels 308, 309 or from the rear wheels of tractor 302.

Two cane dropping assemblies 310, 311 are provided, one for each of the planter units 288, 289. These assemblies are constructed as in the two embodiments described above and are mounted on frame 294 through respective masts 312 rigidly fixed to the frame and parallel links 314, 316, these parts corresponding to items 194, 196 and 198 in the previous embodiments.

The two main hoppers 292, 293 of the planter units 288, 289 are supported on a common frame or chassis 318 by a pair of wheels 320, 321. A forwardly extending drawbar 322 interconnects chassis 318 with the remainder of the implement so that the assembly of the two main hoppers 292 and 293 is drawn thereby in trailed relationship thereto. A conventional pin connection 324 as used with agricultural trailers allows the drawbar to be pivotally connected to a clevis on frame 324 so as to be easily disconnected and the main hopper assembly detached.

Two chain and slat conveyors 326, 327 are provided, one in each of the main hoppers 292, 293 and deliver cane billets to the cane dispensing mechanisms 290, 291 as in the previous embodiments. Each conveyor comprises a generally horizontal lower portion 328 leading to an upwardly inclined elevating portion 330. A wedge or roof-shaped partition 332 is provided between the conveyors. This ensures that cane billets cannot lie between the conveyors and as it is only a low structure it hardly forms a significant division between hoppers 292, 293 which can therefore be considered as a single large hopper with twin discharge conveyors. The hopper has a sloping rear wall 334 and thus the conveyors can effect complete emptying of the hopper.

A similar wedge, or roof-shaped partition 336 is provided between the dispensing mechanisms 290, 291 to guide the billets into the dispensing mechanisms. It will be noted that for this reason, the dispensing mechanisms slope in opposite directions. Baffle plates 338, 340 mounted on hoppers 292, 293 similarly help to guide billets into the dispensing mechanisms as they fall from the discharge ends of conveyors 326, 327.

Drives (not shown) are provided for conveyors 326, 327 from ground wheels 320, 321 each including manual control means in the form of a clutch permitting interruption of the drive so that a desired level of billets can be maintained in the dispensing mechanisms 290, 291.

The planter of FIGS. 9, 10 and 11 operates in a substantially similar manner to those of the embodiments described above. However, the mounting of the billet dispensing mechanisms 290 and 291 and the cane dropping assemblies 310, 311 on the tractor links (i.e. as a fully mounted implement), and the connection of the assembly of main hoppers 292, 293 and their elevators thereto as a fully trailed implement provides three benefits. Firstly, it improves maneuverability, secondly it provides better lateral control of the furrow openers of the cane dropping assemblies (i.e. prevents the rows wandering), and thirdly it allows quicker alignment of the planter into a desired position at the start of each traverse of a field to be planted.

It will be appreciated that this arrangement and mounting of the parts of the planter is equally applicable to a one-row planter.

A further advantage of the trailed main cane hopper is that it can be used for transporting cane from a harvester harvesting green cane. If two or more such trailers are employed to ferry cane from the harvester then the stoppage time for recharging the planter is reduced to a minimum.

Figure 12:
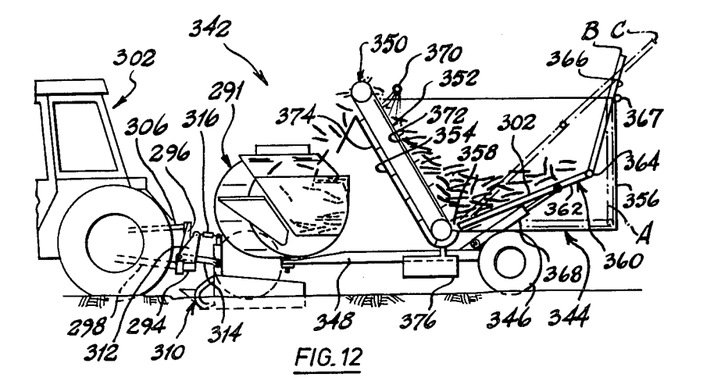
FIG. 12 shows, in a view similar to that of FIG. 10, a further embodiment of the invention.

In the embodiment of FIG. 12, a planter 342 has a billet dispensing mechanism and cane dropping assembly constructed and arranged and mounted on a tractor as in the embodiment of FIGS. 9 to 11 and these parts are therefore identified by the same reference numbers as in FIG. 10 and are not described further.

Planter 342 has a main cane hopper 344 mounted on wheels 346 and drawn by means of a drawbar 348 as a fully trailed implement, as in the previous embodiments.

Main cane hopper 344 has a chain and slat elevator conveyor 350 positioned to elevate billets out of the hopper and to drop them into the billet dispensing apparatus 291 as in the previous embodiments. The conveyor comprises a single upwardly inclined conveying run 352 and an associated return run 354.

Hopper 344 comprises a generally box-shaped container 356 having mounted therein, on a transverse pivot 358, movable cane support means 360 in the form of a liftable floor portion 362 having connected thereto by a hinge 364, also having a transverse axis, a wall portion 366 which can slide on the upper edge 367 of the rear wall of the container.

An actuator in the form of a hydraulic ram 368 acts between cane support means 360 and drawbar 348 to move the support means from a position (shown in dotted lines and identified by reference letter A) in which the full volume of container 356 is available to receive cane, through position B to position C, in which all cane pieces tend to slide towards conveyor 350. It will be appreciated that this arrangement permits the hopper to be completely filled and completely emptied.

Treatment means is provided adjacent conveyor 350 to treat cane billets carried thereon with a suitable chemical or other agent, e.g. a fungicide to prevent pineapple disease. The treatment means comprises a spray head 370 operative to spray liquids across the full width of conveyor 350, and liquid collection means. The liquid collection means comprises a perforated floor 372 positioned under conveying run 352 of the conveyor, a collection plate 374 positioned under return run 352 thereof, and a reservoir 376 positioned to receive liquid from the collection plate.

A hydraulic pump (not shown) mounted adjacemt A-frame 296 is driven by the tractor's p.t.o. shaft and pumps liquid to sprayhead 370 from reservoir 376 through hydraulic conduits (not shown). A filter is provided in the path of fluid drawn from the reservoir.

In use, main hopper 344 is filled, with cane support means 360 in position A. Cane planting proceeds as described in connection with the preceding embodiments. Ram 368 is progressively extended, and spray head 370 applies a heavy dose of fungicide to the billets before they reach the billet dispensing mechanism.

The provision of movable cane support means 360 to tip the cane billets towards conveyor 350 minimizes damage to the "eyes" or "nodes" of the cane from which new growth occurs, while allowing the use of a large capacity hopper.

The use of a spray head in combination with liquid collection means on hopper 344 allows a very heavy dose of liquid fungicide to be applied while still achieving economy in the use of fungicide.

The principal advantage of the embodiments of the invention described above lie in the effective and simple apparatus for dispensing cane billets from a mass of billets in random orientations. The provision of attitude control means to maintain the cane carrier elements horizontal throughout their travel has the advantage that the cane carried on the elements can be subjected to a series of operations (pick-up, alignment, doffing of excess pieces and discharge) at any selected time throughout its entire circular path. During its travel on the cane carrier elements the cane is held in position only by its weight and is therefore readily subjected to alignment and doffing. Furthermore the attitude control means allows the unloading station to be positioned at or near the lowest point in the travel of the cane carrier elements thereby improving the accuracy of cane placement and simplifying the cane dropping apparatus needed.

The scope of this invention is of course not limited by all the details of the above-described embodiments. In particular, it is to be understood:

1. that the cane carrier elements need not follow a circular path. They could be arranged to follow a non-circular path by being mounted on a belt or chain trained in the desired configuration.

2. that the planter need not be provided with furrow opening or closing apparatus. These operations could be performed by other implements proceeding ahead of and behind the planter;

3. that the attitude of the support plate 84 for the cane carrier elements need not be as shown in the drawings. Its inclination to the horizontal could be between 45° and 90°;

4. that the attitude of the cane carrier elements 88 which is maintained by the attitude control means need not be exactly horizontal;

5. that the axis of rotation of the support plate 84 and associated components need not be arranged transverse to the direction of forward motion of the planter. The axis could be at any angle or parallel to said direction if desired.

What we claim is:

1. A sugar cane billet planter including a frame, a pick-up hopper mounted on the frame, a support plate rotatably journaled on the frame with a portion of one face of the support plate forming at least part of one wall of the pick-up hopper, cane carrier elements pivotally attached to said one face of the support plate, a control member rotatably journaled on the frame adjacent to the support plate, a control link connected to each cane carrier element and to the control member to control the position of the cane carrier element, drive means to rotate the support plate and thereby move each cane carrier element through the pick-up hopper where each carrier engages cane billets and carries some of the billets out of the pick-up hopper and cane carrier element unloading means mounted on the frame for removing cane billets from each cane carrier element after the cane carrier element has transported cane billets out of the pick-up hopper.

2. The sugar cane billet planter of claim 1 including a doffing member mounted on the frame for removing excess cane billets from the cane carrier elements and dropping them back into the pick-up hopper.

3. The sugar cane billet planter of claim 1 including furrow opening means mounted on the frame.

4. The sugar cane billet planter of claim 1 including a hopper and conveyor mechanism for supplying cane billets to the pick-up hopper.

* * * * *